UNITED STATES PATENT OFFICE 2,478,425

MANUFACTURE OF CELLULOSE ACETATE

George A. Richter and Lloyd E. Herdle, Rochester, N. Y., assignors to Eastman Kodak Company, Rochester, N. Y., a corporation of New Jersey No Drawing. Application March 26, 1946, Serial No. 657,347

3 Claims. (Cl. 260—229)

This invention relates to the manufacture of cellulose acetate in which cellulose sheet is treated for a short time at an elevated temperature with aqueous acetic acid, pressed, and then treated with glacial acetic acid and catalyst for a short time at an elevated temperature whereby cellulose is quickly prepared for esterification.

It is commonly recognized in the cellulose ester art that acetylation-grade cellulose prior to its esterification with fatty acid anhydride and catalyst needs to be activated. This treatment is referred to ordinarily as pretreatment, presoaking, or activation. Ordinarily, the activation of cellulose is accomplished by wetting the cellulose in glacial acetic acid and allowing to stand for periods of time up to several hours. It has been disclosed in the art that the presence of some moisture facilitates the activation operation, but in view of the fact that this added moisture consumes acid anhydride, substantially anhydrous pretreating conditions have been preferred, even though the time of treatment has been prolonged. In those prior processes the cellulose has been pretreated while in bulk form, hence activation of the entire mass has been governed by the time that it has been necessary for the liquid to reach all of the particles of cellulose therein and cause satisfactory activation of those remotely located particles as well as those which were easily contacted with the pretreating acid. Mechanical mixing of the fibrous mass of cellulose and fatty acid is often resorted to in order to hasten contact of acid and cellulose.

U. S. Patent No. 1,731,299 of Dreyfus describes a pretreatment method in which cellulose in bulk form is pretreated with acetic acid at an elevated temperature. This patent points out that with glacial acetic acid at 100° C. a pretreatment time of one to six hours is necessary. With a more dilute pretreating acid or a lower temperature it is stated that a longer time of treatment is necessary.

In U. S. Patents Nos. 1,236,578, 1,265,216, and 1,338,661 of Lindsay the pretreatment of cellulose with acetic acid of 75-98% strength is disclosed. Unless that pretreatment operation is carried out for a couple of hours, the cellulose is but poorly activated and the acetylation operation requires a long time, such as 24 to 30 hours.

In some methods of activation the cellulose has been treated with a solution of sulfuric acid in acetic acid. This ordinarily has resulted in reduction of the viscosity of the cellulose, particularly for the times prescribed in prior art processes. For instance, German Patent No. 163,316 describes the pretreatment of cellulose with glacial acetic acid containing sulfuric acid at a temperature of 60-70° C. for 1½ to 2 hours. It has, however, been stated by some investigators that the preliminary treatment should preferably not include the acetylating catalyst as this may lead to the formation of degraded cellulose acetates whose solutions have a low viscosity and cast brittle films.

We have found, however, that contrary to these prior disclosures cellulose may be rapidly pretreated if the conditions of operation are carefully controlled. Also, we have found that cellulose pretreated by our method is readily susceptible to acetylation to form cellulose esters having a haze and color value superior to that of the usual run of cellulose esters which have been heretofore prepared with the same base fiber. We have found that by pretreating the cellulose in sheet form a rapid uniform pretreatment of the cellulose occurs as compared with cellulose which is in bulk form and excess fatty acid is easily removed by means of squeeze rolls.

One object of our invention is to provide a method for rapidly activating cellulose so that the tying up of equipment or the storing of cellulose is unnecessary. Another object of our invention is to provide a cellulose in which the catalyst is distributed therein so that upon contact with acetic anhydride the esterification goes rapidly and uniformly. A further object of our invention is to provide a method of preparing cellulose acetate having haze and color properties superior to those which are obtained ordinarily with a given cellulose base in commercial processes of making cellulose acetate. Other objects of our invention will appear herein.

In its broadest aspects our invention comprises the use of a sheeted cellulose having a uniform texture, such as an acetylation-grade pulp or sheeted cotton linters as made by the use of a Fourdrinier paper machine. It is desirable that the cellulose sheet which is employed have a density of no more than .6 or .7 and a dry weight of about 100 pounds per 1000 square feet to insure an adequate penetration of the pretreating materials into the cellulose.

This cellulose sheet, either in bone-dry or air-dry form, refined cotton linters, high alpha-cellulose woodpulp, or mercerized woodpulp, from sulfite, kraft, or multiple cook, is immersed in acetic acid containing 2-10% water at 50° to boiling for fifteen seconds to five minutes, such as would be obtained by running a sheet of the cellulose through a pretreating bath. This treatment does not disintegrate the sheet. After this treatment the cellulose sheet has liquid removed therefrom, such as by pressing or draining or both until the sheet is reduced considerably in liquid content. It is then dipped into a mixture of glacial acetic acid and acetylation catalyst, usually sulfuric acid, the catalyst being in 2-7% solution in the acetic acid. This treatment is at a temperature within the range of 20-60° C. for thirty seconds to fifteen minutes after which the cellulose sheet is taken from the liquid in which it is immersed and squeezed, such as by again draining and pressing. The thus-obtained cellulose sheet is then ready for acetylation by mixing it with fatty acid anhydride and, if necessary, more catalyst. By this means a product is obtained having a good solution clarity, and color value.

The cellulose sheet which is activated in accordance with our invention may be wetted by the various pretreating liquids by immersion therein. A convenient way of accomplishing this is by passing the dry sheeted fiber through hot aqueous acetic acid, allowing it to travel out of that acid through squeeze rolls, and then into another immersion operation, using glacial acetic acid and catalyst, and pressing again. Instead of acetic acid which would of course be employed where cellulose acetate is being manufactured, other fatty acids may be employed, such as propionic or butyric acid. As, however, acetic acid is a more active pretreating agent than propionic or butyric acids, the use of the former is preferred. Ordinarily, the cellulose sheet is only in contact with the pretreating liquid from fifteen seconds to five minutes. As, however, the cellulose sheet is wet with liquid up until the time that it reaches the squeeze rolls, the actual time in which the sheet is in contact with a goodly amount of pretreating liquid might actually be any time up to less than five minutes. Therefore, this invention is to be understood as including treatment times up to five minutes with each of the liquids employed in the two-step pretreatment operation. As soon as possible, however, after the treatment of the dry cellulose sheet with liquid, it is squeezed, such as down to a liquid content of about 50%. This is best accomplished by running the cellulose sheet through squeeze rolls.

In one method of operation the dry cellulose sheet is immersed in aqueous acid, such as acetic acid of 90-98% concentration at a temperature within the range of 50-100° C. for thirty seconds to two minutes. If the sheet is being moved along at the rate of ⅓ foot per minute, the distance which the sheet need travel while immersed in the acetic acid need only be 4 to 8 inches. The cellulose sheet is then drained and pressed, such as by passing through squeeze rolls until it is about 50% dry. If the first stage pretreatment is carried out with 96% acetic acid, the pressed sheet contains about 3-4% of moisture. It is then passed into a solution of sulfuric acid in acetic acid, the sulfuric acid being 2-7% (2% sulfuric acid is sufficient for most commercial types of wood cellulose) of the bath, and kept at a temperature of 20-60° C. for thirty seconds to two minutes, the precise time considered most desirable depending upon the susceptibility of the cellulose sheet to penetration. The cellulose sheet is then taken out continuously and squeezed as before so that it is, for instance, 50% dry. This sheet, will therefore, contain 5-10% of catalyst based on the cellulose. It is then comminuted and acetylated by introducing into an acetylation vessel containing acetic or some other anhydride, and, if desired, additional catalyst. The cellulose pretreated in accordance with our invention acetylates very well as judged by other acetylation processes and gives products superior as regards haze and color to the corresponding products obtained by normal acetylation procedures. For instance, an acetylation-grade woodpulp as acetylated by normal procedure gives a product having a haze of 10 cm. and a color of 300. Using the same pulp in accordance with our invention a product is obtained having a haze of 20-25 cm. and a color of 150-175. The haze value is determined by the length of dope which must be penetrated by light in order to give a certain opaqueness and, therefore, the product prepared in accordance with our invention is a considerable improvement over that obtained by normal procedure. Also, the cellulose ester is more nearly colorless than that obtained by a normal procedure.

With mercerized pulp which is difficult to acetylate by ordinary processes a product is obtained in accordance with our invention having even better haze and color characteristics. For instance, with a mercerized pulp in a normal acetylation procedure a dope or mass is obtained which may be characterized as a mush, whereas by the rapid pretreatment, which characterizes our invention, and acetylation of mercerized pulp a cellulose triacetate dope of good clarity and good color is obtained.

A typical operation in accordance with our invention is one in which a dry mercerized pulp sheet, such as laid down by a Fourdrinier paper machine is pasesd through boiling 96% acetic acid so that it is immersed in that acid for two minutes, then passed through squeeze rolls so that the amount of acid left in the cellulose sheet is 40-50% of the sheet, after which the sheet is passed through glacial acetic acid containing 3% of sulfuric acid at a temperature of 35° C. for two minutes and again put through squeeze rolls so that the sheet obtained has a 50-60% cellulose content. This operation is particularly advantageous for preparing the cellulose for esterification where a large number of esterification vessels are being supplied. The cellulose may be prepared for esterification in but a few minutes and then fed directly to the esterification vessels as needed. However, if storage of the pretreated cellulose is desired, the cellulose sheet may be run over a cold roll, such as having a temperature of 15° C. and may be kept for one or two hours at the lowered temperature without seriously degrading the cellulose. If the catalyst-containing sheet is chilled to a frozen state, much larger hold-over periods can be maintained without serious additional degradation. It is an important feature of our pretreatment process, however, that the cellulose must be either immediately used or be kept chilled (such as to 16° C.) and then only for a short time (with greater chilling, holding period may be longer) prior to introduction into the esterification vessel.

Our pretreatment process is also adapted for a continuous acetylation method in which a cellulose upon activation is immediately run into an acetylation chamber where a quick acetylation is taking place, such, for example, as described as regards the acetylation portion of the process in Fordyce and Crane application, Serial No. 657,223, filed of even date. One advantage of our pretreatment process is that a desired proportion of sulfuric acid can be incorporated in the cellulose sheet so that it is uniformly distributed therethrough. For instance, if the acetic acid in which the sheet is immersed is 3% sulfuric acid and the treatment is carried out at a temperature of 50° C. and the sheet is prepared so that it has a 50% cellulose content, the resulting cellulose sheet will have a total sulfuric acid content of about 6.5%, based on the weight of the dry cellulose. With a change of sulfuric acid concentration, or amount of squeezing, this value will change, but from time to time with the same conditions, a cellulose having substantially the same sulfuric acid content will be obtained. After the sheet has been pretreated as described, it is then mixed with acetic anhydride, or, if desired, propionic or butyric anhydride in the proportion of 3-6 parts of anhydride to one of cellulose. If desired, additional fatty acid, such as acetic acid, may be added to promote the reaction. For most esterification processes the proportion of catalyst incorporated by the pretreatment is sufficient, particularly if a high viscosity cellulose ester is being prepared. However, the catalyst amount may be adjusted in the acetylation step as desired, if that which is adsorbed by the cellulose is not sufficient for the purpose at hand. Due to the uniform activation of the cellulose and the uniform distribution of catalyst therethrough in the production of the pretreatment, the esterification proceeds rapidly and a dope is obtained in a minimum of time. The cellulose ester may then be hydrolyzed in the customary manner, such as by adding dilute aqueous acetic acid to the mass and maintaining it at 100° F. until the desired hydroxyl content is obtained.

The following example illustrates the pretreatment of cellulose in accordance with our invention:

A nine-gram portion of a sheet of refined wood cellulose of commercial grade weighing 100 pounds per 1000 square feet and having a thickness of .048 inch was immersed in 250 cc. of a solution containing 96% acetic acid and 4% water at 100° C. for two minutes. The sheet was then squeezed between stainless steel rolls to 50% dryness. The acetic-acid containing sheet was then immersed in 250 cc. of a solution containing 3% of sulfuric acid and 97% acetic acid at 50° C. for two minutes with good agitation. The sheet was then squeezed to 50% dryness between stainless steel rolls. The pretreated cellulose sheet was then acetylated by introducing into a vessel containing 31 cc. of acetic anhydride and 64 cc. of acetic acid that had been precooled to 11° C. The mass was agitated for one hour at a temperature of 38° C. Thirty cc. of 87% aqueous acetic acid chilled to 5° C. were added to the mass or dope and the whole was well shaken. The resulting mass or dope had a haze reading of 24 cm., a viscosity of 50 seconds and a good color. The mass was exceptionally free of unacetylated fiber. Dopes made from the same cellulose material by orthodox procedures give haze readings of around 10 cm., the same viscosity, and only a fair color.

Our invention contemplates generally the use of acetylation catalysts in the pretreatment operation, this operation not being confined only to sulfuric acid although that is the catalyst most generally employed. Other catalysts, such as zinc chloride, perchloric acid, or the like may be employed. Instead of acetic acid, propionic or butyric acid may be employed in the pretreatment operations. For instance, in the example given, propionic or butyric acid can be substituted for acetic acid using the same amounts. The thus pretreated cellulose may then be esterified with propionic or butyric anhydride, if desired, with or without the addition of further catalyst to promote the reaction. In that case dopes of good haze and clarity characteristics are also obtained as compared with the dopes obtained in accordance with the standard procedures.

We claim:

1. A method for continuously preparing cellulose for esterification which comprises continuously passing a cellulose sheet having a density no more than .7 and a dry weight of about 100 lbs. per 1000 square feet into a bath of an aqueous lower fatty acid containing 2-10% of water and treating the cellulose with that liquid at a temperature of 50-100° C. for a time of not more than five minutes but sufficient to impart activation to the cellulose, then passing the sheet through squeeze rolls to reduce its liquid content, followed by passing the sheet into a 2-7% solution of an acylation catalyst in a lower fatty acid and treating the cellulose therewith for thirty seconds to fifteen minutes at a temperature of 20-60° C. and again passing the sheet through squeeze rolls to reduce its liquid content whereby an activated cellulose is continuously obtained.

2. A method for continuously preparing cellulose for esterification which comprises passing continuously cellulose sheet having a density no more than .7 and a dry weight of about 100 lbs. per 1000 square feet into aqueous acetic acid at a temperature of 50-100° C. and treating the cellulose for a time of not more than five minutes but sufficient to impart activation thereto, then continuously passing the so-treated sheet through squeeze rolls to reduce its liquid content, then continuously passing the sheet through glacial acetic acid containing 2-7% of an acylation catalyst so that the sheet is in contact with this liquid for thirty seconds to fifteen minutes at 20-60° C., and then leading the sheet after this treatment through squeeze rolls in a continuous fashion whereby activated cellulose sheet having catalyst uniformly distributed therethrough is obtained.

3. A method of preparing cellulose acetate having good haze characteristics which comprises continuously passing a cellulose sheet having a density of not more than .7 and a dry weight of about 100 lbs. per 1000 square feet through aqueous acetic acid containing 2-10% of water, the cellulose being treated at a temperature of 50-100° C. and for a time not more than five minutes but sufficient to impart activation to the cellulose, continuously withdrawing the sheet from the bath and passing through squeeze rolls to reduce its liquid content, continuously withdrawing the sheet from the squeeze rolls and immersing in a 2-7% solution of sulfuric acid in glacial acetic acid for thirty seconds to fifteen minutes at 20-60° C., continuously withdrawing the sheet from the catalyst solution and leading through squeeze rolls to reduce its liquid content, followed by continuously leading the sheet into a lower fatty acid anhydride bath wherein a cellulose ester is formed.

GEORGE A. RICHTER.
LLOYD E. HERDLE.

REFERENCES CITED

The following references are of record in the file of this patent:

UNITED STATES PATENTS

| Number | Name | Date |
| --- | --- | --- |
| 2,140,639 | Malm et al. | Dec. 20, 1928 |
| 2,143,785 | Malm | Jan. 10, 1939 |
| 2,261,237 | Dreyfus | Nov. 4, 1941 |
| 2,315,973 | Malm | Apr. 6, 1943 |